(12) United States Patent
Clark

(10) Patent No.: US 7,198,724 B2
(45) Date of Patent: Apr. 3, 2007

(54) APPARATUS FOR TREATING FLUIDS WITH ULTRASOUNDS

(75) Inventor: Piers Benedict Clark, Epsom Surrey (GB)

(73) Assignee: Sonico Limited (DE)

(*) Notice: Subject to any disclaimer, the term of this patent is extended or adjusted under 35 U.S.C. 154(b) by 0 days.

(21) Appl. No.: 10/471,774

(22) PCT Filed: Mar. 18, 2002

(86) PCT No.: PCT/GB02/01283

§ 371 (c)(1),
(2), (4) Date: Apr. 9, 2004

(87) PCT Pub. No.: WO02/074436

PCT Pub. Date: Sep. 26, 2002

(65) Prior Publication Data

US 2004/0154991 A1    Aug. 12, 2004

(30) Foreign Application Priority Data

Mar. 16, 2001 (GB) .................... 0106483

(51) Int. Cl.
*C02F 1/36* (2006.01)
(52) U.S. Cl. .................. 210/748; 366/108
(58) Field of Classification Search ............... 210/748; 366/108, 114, 127; 204/554, 193; 116/137 A; 310/322, 334
See application file for complete search history.

(56) References Cited

U.S. PATENT DOCUMENTS

| | | | | |
|---|---|---|---|---|
| 3,904,392 A | * | 9/1975 | VanIngen et al. | 95/30 |
| 4,147,114 A | * | 4/1979 | Holmes | 110/221 |
| 4,428,757 A | * | 1/1984 | Hall | 96/175 |
| 4,433,916 A | | 2/1984 | Hall | |
| 4,756,478 A | * | 7/1988 | Endo et al. | 239/102.2 |
| 4,944,886 A | * | 7/1990 | Masri | 210/748 |
| 5,186,389 A | * | 2/1993 | Shibano | 239/102.2 |
| 5,384,508 A | | 1/1995 | Vaxelaire | |
| 6,361,747 B1 | * | 3/2002 | Dion et al. | 422/128 |
| 6,395,186 B1 | * | 5/2002 | De Kock et al. | 210/748 |

FOREIGN PATENT DOCUMENTS

| | | |
|---|---|---|
| EP | 0 648 531 A1 | 4/1995 |
| WO | WO 95/04600 | 2/1995 |
| WO | WO 00/07941 | 2/2000 |

* cited by examiner

*Primary Examiner*—Matthew O. Savage
(74) *Attorney, Agent, or Firm*—Nixon Peabody LLP; Jeffrey L. Costellia

(57) ABSTRACT

The present invention relates to a fluid processing apparatus for use in an elongate passage (10), the apparatus comprising one or more means for applying ultrasonic energy to fluid (16) within the passage (10) and means for constraining flow of fluid (30) towards the longitudinal axis of the elongate passage.

14 Claims, 4 Drawing Sheets

APPARATUS FOR TREATING FLUIDS WITH ULTRASOUNDS

This invention is concerned with fluid processing devices, particularly but not exclusively for use in the treatment of sewage. By the term "sewage" as used herein, we mean domestic/municipal and industrial wastewaters and sludges.

It has been found that the application of ultrasonic energy to sewage improves subsequent response of the sewage to treatment. For example, in the specification of European patent 0648531 there is described a fluid processing device comprising a chamber through which fluid to be processed may be fed, and an operating member having a circular cross-section in the chamber, the operating member comprising a plurality of surfaces including at least one interior circumferential surface, the device comprising means to cause said surfaces to vibrate at an ultrasonic frequency. In use, the fluid to be treated is flowed through the chamber and over the circumferential surface, whereby ultrasonic energy is provided to the flowing fluid.

It has been now found that an advantageous fluid processing a device, particularly for the treatment of raw sewage, comprises an elongate passage conveniently of circular cross-section through which fluid to be processed is fed, a plurality of axially spaced operating members in the passage, each operating member having an inner surface defining an inner passage through which fluid flowing through the device passes, and means to cause the inner surface of the operating members to vibrate at ultrasonic frequency generally radially of the operating member. In use, sewage flow through the elongate passage flows through the inner passages wherein it is subjected to ultrasonic energy derived from the vibrating inner surface of the operating members.

It has, however, been found that detritus contained in the raw sewage, such as rags, paper, plastics etc., tends to accumulate in areas of low flow rate between the operating members, (ie. "dead" areas) which may eventually produce a reduction to the rate of flow of fluid through, the device, and possibly cause a blockage. This problem is exacerbated in a preferred fluid processing device, wherein to increase the amount of ultrasonic energy applied to the fluid, the fluid also flows over outer surfaces of the operating members, particularly through generally annular passages between said outer surfaces and the interior surface defining the elongate passage.

An object of the present invention is to overcome the problems of the prior art.

According to one aspect of the present invention there is provided a fluid processing apparatus for use in an elongate passage, the apparatus comprising:
one or more means for applying ultrasonic energy to fluid within the passage;
wherein the apparatus further comprises means for constraining flow of fluid towards the longitudinal axis of the elongate passage.

In preferred embodiments the one or more means for applying ultrasonic energy have an inner passage through which fluid flowing through the apparatus passes.

According to a further aspect of the present invention there is provided a fluid processing apparatus for use in an elongate passage, the fluid processing apparatus comprising:
one or more means for applying ultrasonic energy to fluid within the passage, the means for applying ultrasonic energy comprising a vibration member having an inner passage;
fluid directing means for directing fluid to flow towards the inner passage.

By constraining or directing the fluid flow towards the longitudinal axis of the elongate passage or towards the inner passage, an increase in the flow rate of the sewage is produced. By this means a greater proportion of solids contained in the sewage will flow through the device on or more closely adjacent to the longitudinal axis or directly through the inner passage and thus flow through areas of higher ultrasonic density than otherwise would be the case.

Additionally by increasing the fluid velocity, cavitation is produced which allows the creation of ultrasonic vibrations in those section of the passage which are located between adjacent operating members, increasing the efficiency of the device.

In addition, the increased velocity of flow along the passage ensures that a majority of detritus flows directly through the passage: any detritus which has flowed from the axis or the inner passage will be pulled by the venturi effect towards the longitudinal axis or inner passage.

In this manner it has been found that tendency for detritus to accumulate in the areas of low flow rate between adjacent operating members is reduced.

Additionally, by increasing the proportion of detritus which flows generally along the longitudinal axis directly through the device, reduction to the flow of fluid over the outer surfaces of the operating members by the accumulation in the space between said outer surfaces and the walls defining the elongate passage is minimised.

The means for constraining flow of fluid or the fluid directing means can be produced separately from the elongate passage and, therefore, can be mounted in existing elongate passages.

Preferably said means for constraining flow of fluid or the fluid directing means comprises a funnelling device through which fluid to be treated flows into the device.

The funnelling device can be produced from a sheet of material which is not corrosive in the fluid, for example, stainless steel or plastics materials.

Conveniently said funnelling device is operative to reduce the cross-sectional area through which fluid flows by at least a factor of 4. In preferred embodiments said funnelling device is operative to reduce the cross-sectional area through which fluid flows by at least a factor of 8.

Thus where the elongate passage is of circular cross-section, having a diameter of 150 mm, the funnel device may, reduce the cross-sectional area of the passage to approximately 50 mm diameter.

Preferably said elongates passage as of circular cross-section. The passage, therefore has no corners where detritus may build up.

Conveniently the funnelling device is located within the elongate passage upstream of the one or more means for applying ultrasonic energy. Accordingly, the fluid flow is constrained before it reaches the means for applying ultrasonic energy.

Preferably the longitudinal axis of the inner passage of the or each means for applying ultrasonic energy is substantially coincident with the longitudinal axis of the elongate passage.

Conveniently there are provided a plurality of means for applying ultrasonic energy.

The more means for applying ultrasonic energy that are present the larger the proportion of fluids which will be treated.

Preferably there are provided at least four means for applying ultrasonic energy. By so constraining the flow of fluid being treated towards the longitudinal axis of the elongate passage, it has been found that good flow characteristics of the fluid through a significantly larger number of sequential operating members has been possible, than would otherwise have been the case. In particular, it has been found by this method that five or more operating devices may be contained within the same elongate passage, enabling a highly efficacious treatment of the fluid to be obtained over a relatively compact distance.

In preferred embodiments each means for applying ultrasonic energy comprises a operating member connected to the vibration member, the operating member being connected to a source of ultrasonic energy.

Preferably an inner surface of the inner passage is arranged to vibrate radially.

According to a yet further embodiment of the present invention there is provided a method of treating fluids, the method comprising: placing the fluid processing apparatus of any, preceding claim into an elongate passage and passing the fluid through the elongate passage.

Preferably the fluid is sewage sludge.

The invention will now be described, by way of illustration only, with reference to the following example and the accompanying figures.

Figure 1:
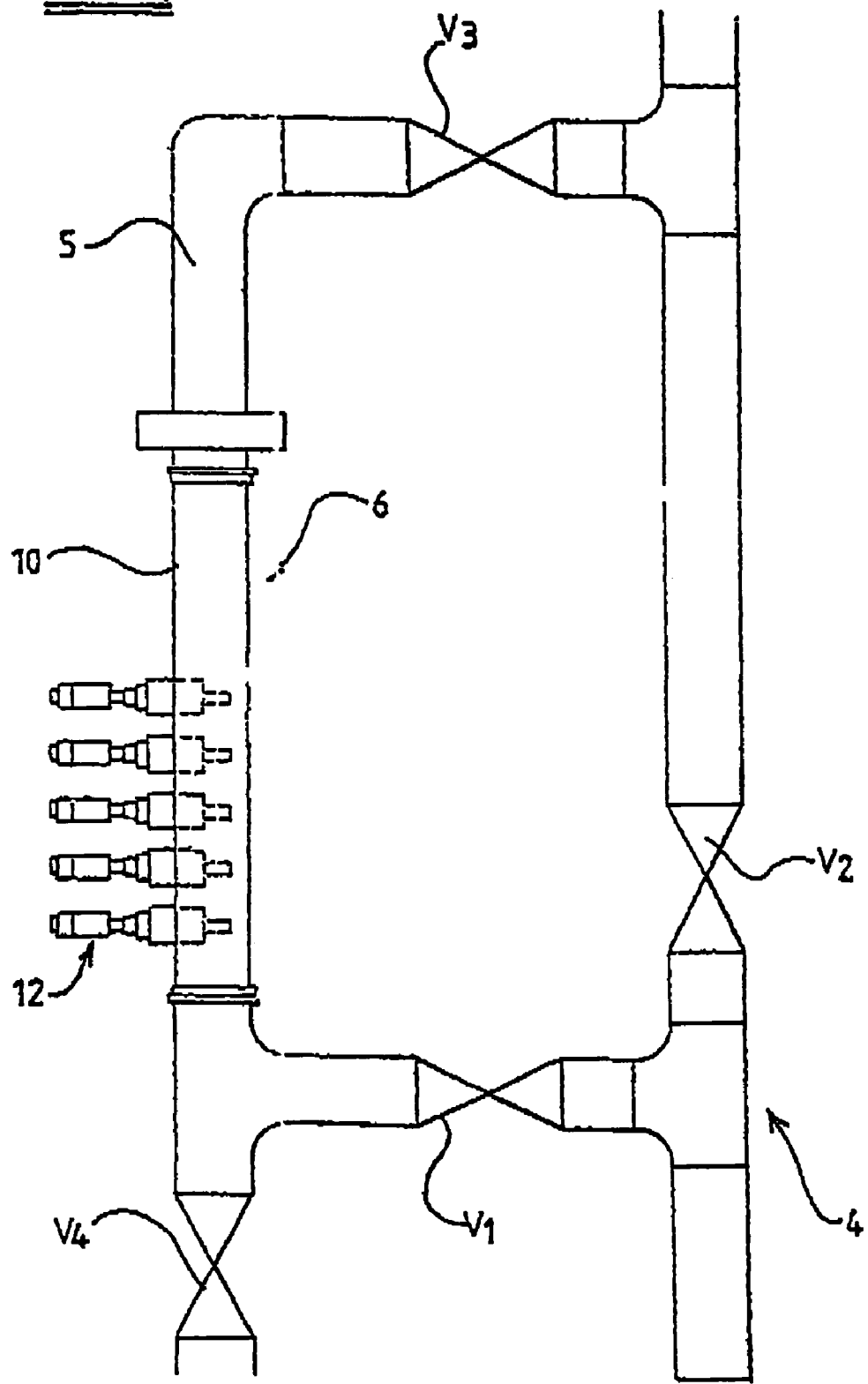
FIG. 1 is a schematic view illustrating part of a flow circuit in which the fluid processing device which is a preferred embodiment of this invention is installed.
Figure 2:
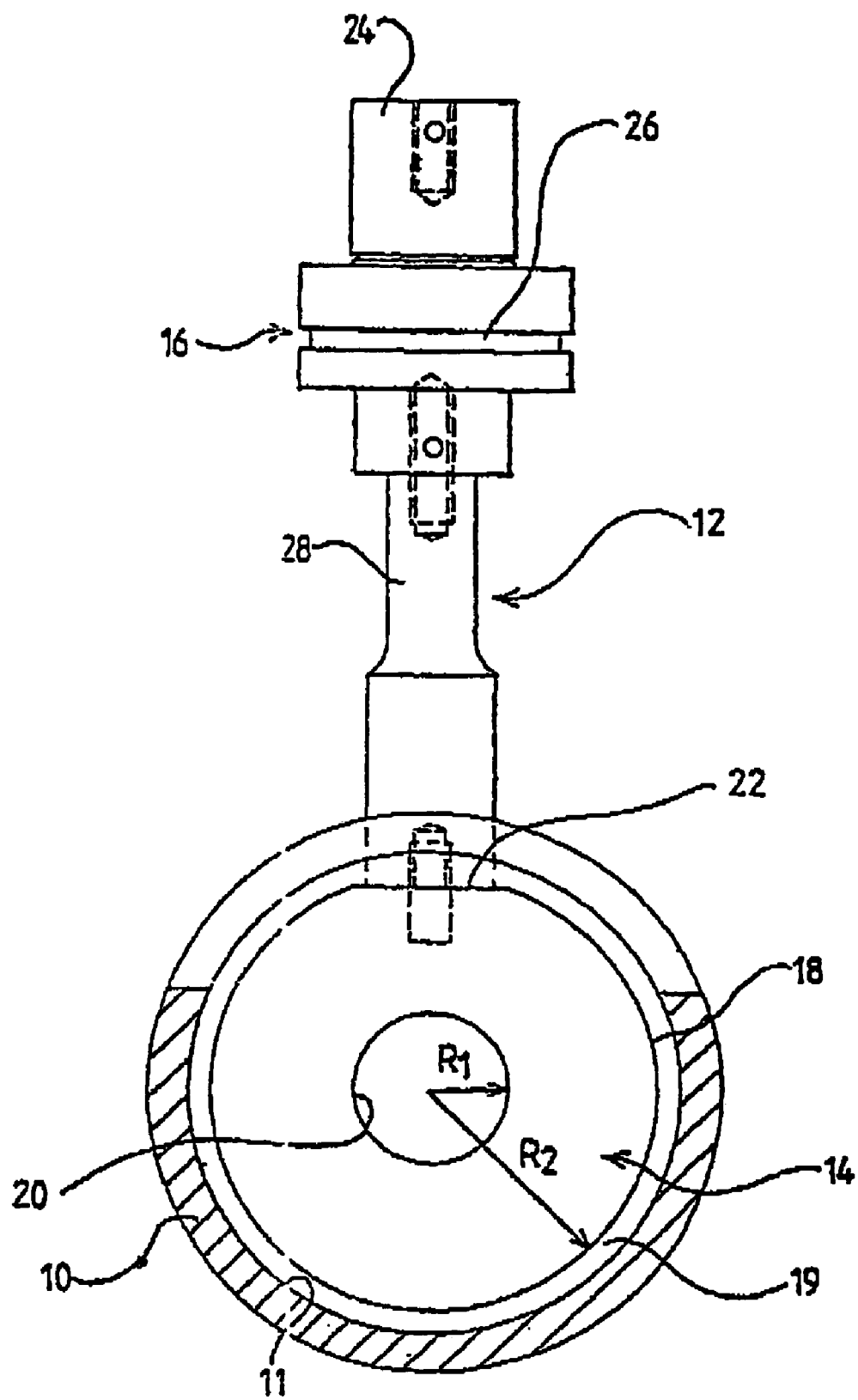
FIG. 2 is a sectional view-showing the mounting of the longitudinal member, of a means to apply ultrasonic energy.
Figure 3:
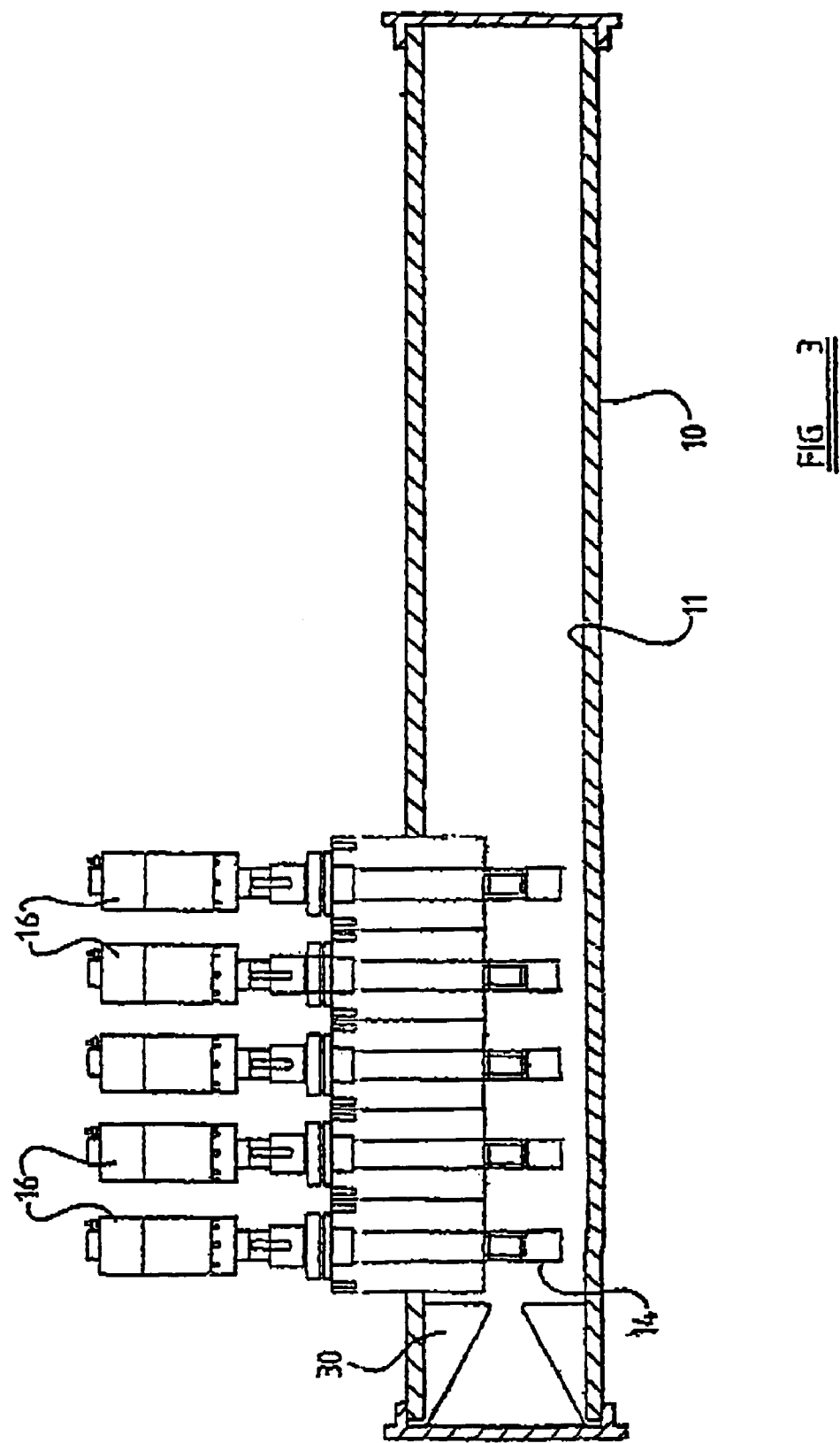
FIG. 3 is a side view of the fluid processing device which is a preferred embodiment of this invention.

The fluid processing device which is a preferred embodiment of this invention is specifically for use in the treatment of raw sewage, and is adapted to be located in a flow-line 5 affording a branch to a main flow-line 4, flow of fluid therethrough being controlled by valves V1, V2, V3 and V4 (see FIG. 1). A preferred embodiment, comprises a longitudinal member afforded by a pipe 10 of circular cross-section, through which in use raw sewage is fed.

Mounted on the longitudinal member 10 are a plurality, in this example five, of operating devices 12, each operating device 12 comprising an operating member 14, and an ultrasonic device 16 connected thereto. Each ultrasonic device 16 comprises a transducer 24, and a flanged booster 26 and a extender 28.

The operating member 14 is of substantially annular cross-section, comprising an outer surface 18, and an inner surface 20. Provided-on the operating member 14 is a tangential flat 22, to which the extender 28 of the ultrasonic device 16 is secured conveniently by means of a weld, the ultrasonic device passing through the wall of the pipe 10. Alternatively, the extender 28 and the operating member 14 can be secured by a screw.

In the present example there are five operating devices 12 mounted on the pipe 10. However, any required number of operating devices can be present.

The inner surface 20 of each operating member defines an inner passage of circular cross-section through which fluid flowing through the device passes, and additionally the annular space between the outer surface 18 of the operating member 14 and the inner wall 11 of the pipe 10 provides an outer passage 19 through which fluid may also flow.

In use, the ultrasonic devices 16 are each energised, causing longitudinal vibrations at ultrasonic frequency to be applied from the extender 28 to the flat face of its attachment to the operating member 14. Specifically, the operating member 14 has an internal radius R1 and an external radius R2, the relationship being such that $(R1+R2)/2=K\lambda$, where K is an integer, and $\lambda$ is the wavelength of the vibrations applied by the ultrasonic device to the operating member 14. In this configuration the outer surface 18 and the inner surface 20 of the operating member alternatively radially expand and contract in a pulsating manner at ultrasonic frequency, apply ultrasonic energy to fluid flowing through the pipe 10.

Figure 4:
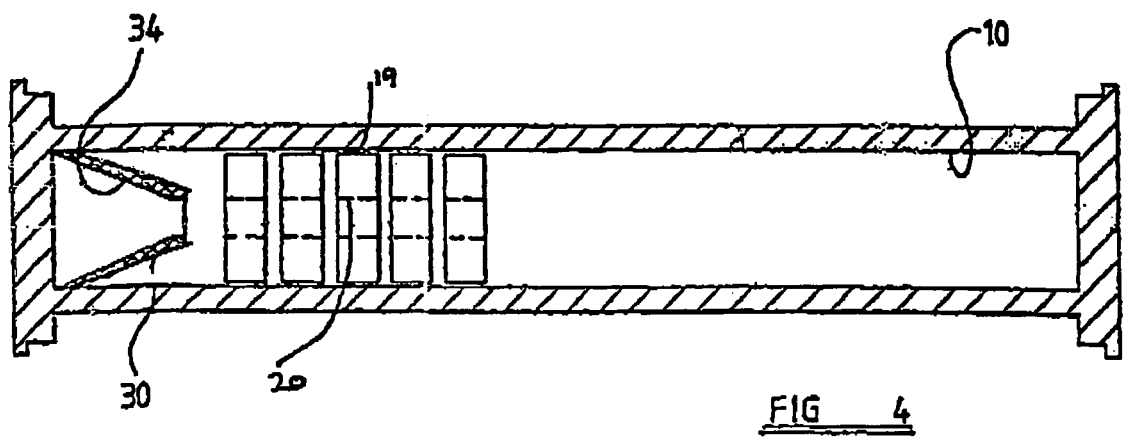
FIG. 4 is an enlarged view showing the mounting of the ultrasonic device to than elongate member.
Figure 5:
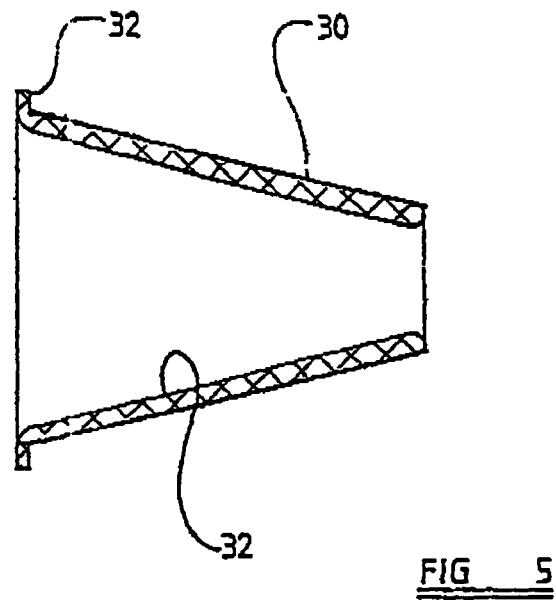
FIG. 5 is an enlarged view of a funnel member of a preferred embodiment.

Mounted in the upstream end of the pipe 10 is a funnel device 30 (FIG. 4) which is a sliding fit in the end of the pipe 10, flanges 32 being provided to locate the funnel member 30 in a desired location within the pipe. The funnel has a frusto-conical surface 34 which reduces the effective radius of pipe 10 typically from substantially 75 mm to substantially 25 mm, ie. approximately equal to the radius R1, reducing the cross-sectional area of the flow passage through the device by a factor of 8 to 10.

In this manner fluid fed through the device is constrained towards the longitudinal axis of the device, increasing the flow rate, and ensuring a greater proportion of solids are located on or close to the longitudinal axis. Additionally, the higher flow rate increases cavitation within the fluid flow, and, therefore, effective ultrasonic vibrations will occur in the sections of the elongate passage located between adjacent operating members. Further, since the fluid is flowing at a higher velocity through the device than would otherwise be the case, the majority of detritus flows directly through the internal flow passage defined by the interior surfaces 20 of operating members 14. In this way the flow of detritus into the relatively "dead" spaces between adjacent operating members 14 is reduced, reducing the tendency of such detritus to clog the outer passage 19.

Further, such detritus as may flow from the longitudinal axis will tend to be pulled back into the main flow stream by the venturi effect of the relatively high speed flow of the fluid through the device.

In this way it has been found that a high density of ultrasonic devices may be utilised, applying a large amount of ultrasonic energy to the fluid flow through the device over a relatively short longitudinal distance, with significantly reduced tendency for blockage to occur.

It is to be appreciated that whilst this invention has been devised specifically for the treatment of raw sewage, the invention may be utilised in the treatment of other fluids, where similar or analogous problems arise, and in particular where it is desired to apply ultrasonic energy to the fluid in an efficient manner.

It will be understood that the embodiment illustrated shows one application of the invention only for the purposes of illustration. In practice the invention may be applied to many different configurations, the detailed embodiments being straightforward for those skilled in the art to implement.

The means for applying ultrasonic energy can be of any shape, for example with a rectangular cross-section. There need not be an inner passage provided therein.

The funnelling device call be integral with the pipe.

The funnelling device may be formed such that there is provided an inner passage with a frusto-conical surface. The outer surface of the device could be any desired shape.

There may be any suitable number of ultrasonic devices placed in the elongate passage for example, 4, 5, 6, 7, 8, 9, 15, 20.

The invention claimed is:

1. Fluid processing apparatus for use in an elongate passage, the fluid processing apparatus comprising:
   one or more means for applying ultrasonic energy to fluid introduced into the elongate passage, the means for applying ultrasonic energy comprising an operating member having an inner passage through which said fluid can flow, the operating member being provided within the elongate passage such that an outer passage is formed between an inner surface of the elongate passage and an outer surface of the operating member;
   wherein said outer passage is in fluid communication with the inner passage within the elongate passage, and flow constraining means in the form of a tapering funnel is provided in said elongate passage upstream of, and spaced from, the inner passage, for introducing said fluid into the elongate passage and for directing said flow of said fluid towards the inner passage.

2. Apparatus according to claim 1, wherein said tapering funnel is operative to reduce a cross-sectional area through which fluid flows by at least a factor of 4.

3. Apparatus according to claim 2, wherein said tapering funnel is operative to reduce the cross-sectional area through which fluid flows by at least a factor of 8.

4. Apparatus according to claim 1, wherein said elongate passage is of circular cross-section.

5. Apparatus according to claim 1, wherein a longitudinal axis of the inner passage of the or each means for applying ultrasonic energy is substantially coincident with a longitudinal axis of the elongate passage.

6. Apparatus according to claim 1, wherein there are provided a plurality of means for applying ultrasonic energy.

7. Apparatus according to claim 1, wherein there are provided four means for applying ultrasonic energy.

8. Apparatus according to claim 1, wherein the or each means for applying ultrasonic energy comprises the operating member being connected to a source of ultrasonic energy.

9. Apparatus according to claim 1, wherein an inner surface of the inner passage is arranged to vibrate radially.

10. A method of treating fluids, the method comprising; placing the fluid processing apparatus of claim 1 into an elongate passage and passing the fluid through the elongate passage.

11. A method according to claim 10 wherein the fluid is sewage sludge.

12. Apparatus according to claim 1, wherein the or each vibration member is a substantially annular member with an internal radius R1 and an external radius R2.

13. Apparatus according to claim 12, wherein the or each vibration member satisfies the relationship $(R1+R2/2=K\lambda)$ where K is an integer and $\lambda$ is the wavelength of the vibrations applied to the vibration member.

14. Apparatus according to claim 12, wherein the outer passage comprises an annular space.

* * * * *